United States Patent Office 3,516,935
Patented June 23, 1970

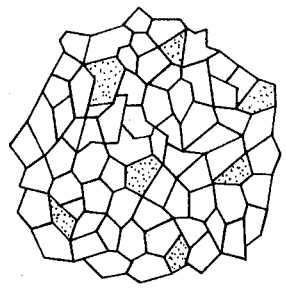

3,516,935
COMPACTED BODY AND METHOD OF FORMATION
Frank R. Monforte, Passaic Township, Morris County, and Frank J. Schnettler, Morris Township, Morris County, N.J., assignors to Bell Telephone Laboratories, Incorporated, Murray Hill, N.J., a corporation of New York
Filed Apr. 10, 1967, Ser. No. 629,629
Int. Cl. C04b *33/02;* F26b *5/06*
U.S. Cl. 252—62.56              13 Claims

ABSTRACT OF THE DISCLOSURE

Bodies of a wide range of materials including ceramics and alloys are prepared by compacting particulate matter produced by freeze drying. This freeze drying procedure includes atomizing a solution of the desired composition, freezing, and removing solvent by sublimation.

BACKGROUND OF THE INVENTION

Field of the invention

The invention is concerned with the preparation of compacted bodies of a wide range of materials. Included compositions are ceramics such as ferrimagnetic spinels and garnets, alloys, and oxides.

Description of the prior art

An exemplary class of materials to which the invention is directed, refractory oxidic mixtures, has in the past been prepared by a series of procedural steps including ball milling. Ferrites and other such oxidic materials prepared by such conventional techniques are of extreme significance. Nevertheless, procedural difficulties have imposed certain limitations on composition and on use.

Probably the most severe limitation is introduced by the need for long-term grinding and mixing to accomplish homogeneity. Long-term ball milling has invariably resulted in contamination, with concomitant drifting in magnetic, electrical, and other properties of device interest. As an example, variations in iron content introduced by steel-ball milling of garnet ceramic compositions delayed their commercial introduction despite recognized need. Commercial utilization of such compositions has only recently been accomplished and only by use of an involved procedure including sample removal and testing during processing.

While reduction in grinding time results in an improvement in gross compositional tolerance, smaller scale homogeneity suffers, resulting in the requirement for higher reaction times or temperatures and in a product which is inferior both from the standpoint of structural homogeneity and compositional homogeneity.

Similar problems occur in the alloy field. For example, nickel-iron compositions utilized for their magnetic properties in the extremely sophisticated devices now in prevalent use must also be extremely uniform, both compositionally and structurally. The requirement is becoming increasingly stringent with miniaturization, which demands consistent magnetic properties from smaller and smaller material sections. Rapidly developing metallurgical procedures have in large part kept pace with the need. However, certain areas exist in which unavailability of sufficiently uniform material has thus far precluded commercial device utilization.

SUMMARY OF THE INVENTION

Excellent compositional and/or structural uniformity results in a compacted body produced from specially prepared particulate matter. In accordance with the invention, a solution of an appropriate composition is broken up into small droplets, the droplets are rapidly frozen so as to prevent substantial coalescence, and the solvent is removed by sublimation. Resulting particles may retain the general shape of the droplets from which they are derived but evidence a porosity resulting from the removal of solvent. Such porous particles may be compacted directly. Where desired, finer powder may easily be prepared by crushing the friable dried droplets.

Imposition of certain conditions and introduction of certain procedural steps give rise to preferred embodiments of the invention. Use of the fundamental process outlined above gives rise to structural uniformity due, in part, to the uniformity in size of the starting particles. Many desired materials are not sufficiently soluble to permit processing by use of any of the conventional solvents. The difficulty is overcome by forming soluble compounds such as salts and by converting these compounds to the desired form after drying. Such conversion may take the form of a thermal decomposition step, reduction, or chemical reaction.

Where the desired final product is multicomponent, the inventive procedure may result in excellent compositional uniformity. As is set forth above, compositional uniformity is often a problem in the preparation of refractory, oftentimes oxidic materials. Starting materials are in such instance converted to a soluble form, and the dried product is thermally decomposed to the desired composition. It is an added advantage that the resulting intimately mixed composition oftentimes permits reaction at relatively low temperature.

The general outline of the inventive procedure is set forth. Certain of the steps are a part of a well-developed technology, all of the detailed procedures and variations of which are, in consequence, not described. It is a necessary part of these procedures that a compacted body be formed. Powder metallurgical techniques and also ceramic-forming techniques are well known. In certain of the procedures, it is desirable to utilize a binder, for example, in the formation of ferrites it is common to use a wax, and none of the consideration entering into the choice or amount of such binder is considered necessary to this description. Deviations, if any, from the usual procedures result from the improvement in the nature of the particulate material entering into the compacted body. All such improvements conspire to reduce the required mixing, pressure, temperature, and/or time. For ceramics, use of conventional firing conditions often results in increased density.

While, as it has been stated, the compacting procedure may be so carried out as to result in finer grain size and/or uniformity in structure, it is possible also to conduct the procedure so as to obtain larger grain size. This variation, which obtains upon prolonged heating and/or increased temperature, produces grain growth which may be advantageous in certain uses. Even where such grain growth occurs, the fact that the particles are initially uniform results in improved uniformity of structure and/or of composition.

For pedantic purposes, the invention is discussed largely in terms of water solvent. Since most desired compositional ingredients are available in water-soluble salt form, the use of the aqueous solution constitutes a preferred embodiment of the invention. Nevertheless, the most significant requirement placed on the solvent is that it be capable of sublimation. Suitable alternative solvents include mercuric chloride, iodine, and camphor.

BRIEF DESCRIPTION OF THE DRAWING

The figure is a reproduction of a photomicrograph of a compacted body produced in accordance with the invention.

DETAILED DESCRIPTION

It is convenient to discuss permitted parameter ranges in conjunction with an outline of the process.

Formation of solution

The solvent, as has been stated, may be water or anything else that can be frozen and removed by sublimation. The latter requirement arises from the need to remove solvent without producing a liquid phase with the attendant increase in solute mobility, which, in turn, results in segregation. The solute material, which may be but a single component but which, in a preferred embodiment, may include at least two components, if soluble in its final desired form may be so utilized in the solution.

Where the final desired form is not soluble in the solvent of concern, it must be put in a soluble form. Soluble forms must, of course, be capable of yielding the desired composition after drying. One manner in which the conversion can be made is by thermal decomposition. Chemical reduction and reaction are also feasible. Inorganic oxides such as are utilized in many ferrimagnetic compositions are essentially insoluble in water and in many other solvents. It has been found expedient to render them soluble by converting them to the corresponding sulphates. Other salts such as carbonates, nitrates, nitrites, etc. may be used. Any such starting materials are added in stoichiometric ratio to the solvent.

Generally, commercial considerations dictate use of concentrations near the saturation limit in the liquid phase at the freezing temperature. Reducing concentration results in the need for larger volume solvent removal and consequent increased expenditure in energy, apparatus, etc.

It is generally undesirable to exceed the saturation solubility content since this results in precipitation which, in the case of a multicomponent system, may produce a compositional gradient. Nevertheless, exceeding the saturation limit by a small amount, not to exceed about 10 percent, may under quick-freeze conditions result in a uniform dispersion of a second phase such as has been found desirable in certain ferrimagnetic ceramics and also in certain ferromagnetic metallics. The same results obtains by use of an additional, substantially insoluble additive.

There are also circumstances where it is desirable to use lesser quantities of solute material. Decreasing the solute-to-solvent ratio results in greater porosity in the dried particulate material, with concomitant increased surface area and increased friability. The latter is desirable where the final compacted product has at least one small dimension of microns or less in magnitude, as, for example, in a ferrite sheet or an alumina coating. While the dilution limit is generally to be determined on the basis of desired end product and on economic considerations, reasonable yield usually dictates use of a solute system content which is at least 5 percent of the saturation content of the entire system in the liquid phase at the freezing point.

It is, of course, an advantage of the procedure that mixing occurs on a molecular scale during dissolution. Such mixing may be accelerated by mechanical stirring and/or by heating, and such may prove expedient where the saturation limit is approached.

Other considerations are apparent and are generally implicit in the foregoing description. For example, it is sometimes necessary to buffer or otherwise adjust the pH of the solution with a view of stabilizing the composition.

Droplet formation

Formation of droplets, generally referred to as atomizing, may take any conventional form. In the examples, it was found convenient to atomize by forcing the solution through an orifice. Alternative procedures include interaction of a rotated disk or air currents with a stream. Droplet sizes, which are a function of orifice size and flow rate, were found to vary from a fraction to a millimeter to several millimeters.

Freezing

It is a requirement that freezing be conducted with sufficient rapidity to prevent substantial coalescence. In general, where droplet collection is by gravity, this gives rise to the requirement that freezing be sufficiently rapid such that all particles are frozen before they strike a solid surface such as the vessel floor. In multicomponent systems, where ultimate homogeneity is desired, still more rapid freezing minimizes compositional gradients. Even where the requirement for extreme compositional homogeneity exists, such may be attained by use of very small droplets and/or by dilute solutions without further adjustment in freezing rate. Particularly where larger droplet sizes are used in multicomponent systems, it may be desirable to use more rapid freezing rates. Generally, it has been found that freezing brought about in a period of one second or less with a preferred time of 0.05 second or less assures adequate compositional homogeneity.

For most expedient operation, it has been found desirable to start cooling the droplets upon formation. This may be accomplished by atomizing immediately before entering a refrigerating fluid. So, for example, droplets have been formed by passage of solution through an orifice inserted in liquid isoheptane maintained at a temperature of $-80°$ C. Other techniques which have proven satisfactory include spraying a mist of solution into liquid nitrogen. It is apparent that more rapid freezing resulting from higher heat capacity in the refrigerant gives rise to a preference for liquids. Suitable refrigerants, in addition to those named, include hexane, cumene, and dimethyl-butane. In general, the requirement is that the refrigerant be liquid at the freezing temperature of the solution and, of course, that no deleterious reaction occur. It is necessary, too, that the refrigerant and the solvent solute system be substantially immiscible. Use of vapors may also be appropriate, although the decreased heat capacity and thermal conductivity results in slower freezing. Also, the desire to prevent substantial coalescene may result in smaller solution-to-refrigerant volume ratios. The value of this ratio is dependent on a number of factors including freezing rate and heat capacity of refrigerant. Experimental conditions which have proven suitable involve a volume ratio of 1:2 to 1:100. Such values should not be considered limitations on the inventive processes and are included only to assist the person repeating the experimental work included in the disclosure.

Regardless of the refrigerant used, greater efficiency results from stirring. Stirring, which inter alia avoids localized heating and possible segregation, may take the form of flowing refrigerant or agitation as by mechanical agitators.

Collection of frozen droplets

Collection may simply take place under the influence of gravity as on a vessel floor, or use may be made of a flow system, with droplets being continuously injected into a moving stream of refrigerant. Collection should, of course, be at a temperature lower than that of the freezing point of the solution. Ordinary precautions should be taken to prevent substantial solid-solid diffusion. For example, the weight of collected frozen droplets should not be sufficient to substantially depress the melting temperature in the case of an aqueous solution.

Sublimation

The main requirement is that no part of the solution be permitted to exist in the liquid phase during this procedural step. In other words, it is necessary that conditions be such that solvent removal occur below the point at which a liquid phase can exist at equilibrium. Sublimation conditions are generally limited by the nature of the apparatus used. It is generally desirable to remove solvent as quickly as possible. Limiting conditions include the maximum rate at which heat may be introduced into the system, as well as the maximum rate at which solvent may be removed. A volatilization rate of solvent which exceeds the removal rate of solvent necessarily results in an increase in pressure.

It is apparent that with aqueous systems at least, the sublimation process must be carried out in a partial vacuum. The equilibrium point of concern in aqueous systems in general occurs at less than 4.5 millimeters of mercury. To permit some reasonable margin, it is generally desirable to operate at pressures of no greater than about one millimeter of mercury. Still lower pressures are permitted and, since they result in an increased sublimation rate, are desired. Readily available commercial vacuum pumps permit operation at pressures of the order of 0.1 millimeter of mercury. The only minimal pressure limitation is introduced by reason of economic considerations.

Once the pressure has been reduced to the desired level, sublimation may be permitted to proceed naturally. Commercially expedient rates are however achieved, at least in an aqueous solution, only by putting heat into the system. It is clear that the maximum permitted heat introduction depends on factors such as heat transfer, decomposition temperature if any, etc.

Conversion

It has been indicated that the dried particles may be incorporated directly in the final body. However, for most commercially significant systems which have been studied thus far, it is found that the final chemical composition is not sufficiently soluble in most readily available solvents. Accordingly, it may be necessary at this stage in the procedure to convert from the soluble form. In the case of oxidic materials, the conversion may expediently take the form of a thermal decomposition with gaseous evolution to yield the oxidic form from the soluble salt. Such optional procedure requires heating to above the decomposition temperature. Usual economic considerations may dictate the actual temperature used. However, certain temperature dependent effects should be considered. For example, it has been found that higher temperature or longer time may result in increased particle size. Reference is here had not to the droplet size, which is generally substantially unaffected during this step but rather to the ultimate particle which may result from crushing the dried droplet. Such particle size, which may be of concern in the formation of extremely fine structures, has been found to range from several angstrom units to one of several microns.

Simply by way of example, where the soluble salts are sulphates, satisfactory decomposition temperatures, of course depending on the nature of the cations, range from about 400° C. to about 1200° C.

Forming

The techniques used in forming the final body are, as has been indicated, conventional. Since the final product is extremely friable due to the great porosity of the frozen droplets, extremely fine powder may result from simple crushing as in a colloid mill. For most purposes, even this step is unnecessary, since substantial compositional uniformity has, if desired, been assured throughout the frozen droplet.

In most cases, it will be found desirable to incorporate a binder. Suitable binders may, for example, take the form of any of the usual waxes found adequate for this purpose.

Firing

This step, necessary in the preparation of refractory materials, may not be required in some instances. Where required, temperatures and times conventionally utilized in formation of the concerned composition may be utilized. As has been indicated, however, lowered reaction temperature resulting from the intimate mixing within the frozen droplets permits reaction at lower temperature and/or for shorter time. Where desired, reaction temperature and time may be increased to result in increased but substantially uniform grain growth. The photomicrograph shown in the figure, which was made at 500× magnification, shows a uniformity in grain size of about 10 microns. The particular system depicted is magnesium manganese ferrite, which was fired at a temperature of about 1300° C. for a period of about 10 hours and was otherwise prepared in accordance with Example 3.

The following examples serve to illustrate the advantages of the inventive processes. For convenience, the operations chosen for the examples utilize similar or identical procedural steps wherever feasible.

EXAMPLE 1

Formation of yttrium aluminum iron garnet of the composition $Y_3Fe_{3.75}Al_{1.25}O_{12}$ Stoichiometric quantities of aqueous sulphate salt solutions of the appropriate cations were mixed together. Actual amounts were 34.48 milliliters $Y_2(SO_4)_3$ containing 15.17 milligrams yttrium per milliliter of solution; 18.15 milliliters $FeSO_4$ containing 22.63 milligrams iron per milliliter of solution; and 2.65 milliliters $Al_2(SO_4)_3$ containing 25.00 milligrams aluminum per millilter of solution. Frozen droplets were produced by squirting the resultant mixed solution through a .005 inch diameter orifice at a volume flow rate of 10 milliliters per minute into liquid isoheptane maintained at a temperature of −80° C. Droplet size of about 0.015 inch resulted. Freezing occurred in a period of about 0.05 second. Frozen droplets were collected on the floor of the vessel and were observed to be substantially uncoalesced. The frozen droplets were placed in a chamber maintained at −50° C., and the chamber was then evacuated to a pressure of 0.1 millimeter of mercury and the temperature was raised by placing on a heater maintained at 100° C. Evolved water vapor was collected by means of a condenser. After a period of 48 hours, the dried contents were removed and were calcined at 900° C. for a period of 16 hours, during which time sulfur dioxide was evolved and the material converted to the corresponding oxides. Ten percent by weight of chlorinated naphthalene wax was added as a binder, and the mixture of wax and dried droplets were pressed at 25,000 pounds per square inch to form ⅜ inch thick discs after which firing was carried out in oxygen at 1450° C. for ten hours. Resultant density was 5.04 grams per cubic centimeter, which is about 99.7% of the theoretical or single crystal density. Compositional homogeneity was observed by means of an X-ray probe with a resolving power of one micron. By comparison, conventional preparation by use of about 16 hours ball milling has resulted in a density of only 5.00 grams per cubic centimeter after firing for twenty hours at 1500° C.

EXAMPLE 2

Formation of zinc aluminate ($ZnAl_2O_4$)

Starting materials: 17:30 millimeters of aqueous $ZnSO_4$ solution (125.98 milligrams zinc per milliliter of solution), 71.95 milliliters $Al_2(SO_4)_3$ solution (25.00 milligrams aluminum per milliliter of solution). Frozen droplets were produced by a 10 milliliters per minute volume flow rate through a 0.015 inch diameter orifice into −80° C. hexane. The volume of refrigerant was about one liter. Freezing took place in a period of about 0.05 second. Collection was again on the floor of the vessel. The drying procedure of Example 1 was repeated. The dried droplets were converted to oxides by calcining for two hours at 900° C., a temporary binder of chlorinated naphthalene wax was added, and a ⅜ inch disc was pressed at 25,000 pounds per square inch. The disk was fired for sixteen hours at 1450° C. in oxygen to yield a density of 4.45 grams per cubic centimeter (96.6% of theoretical density). Despite the fact that conventional processing ordinarily requires a firing temperature of at least 1600° C., the final product was again determined to be homogenous and to consist of the recited composition.

EXAMPLE 3

Formation of the square loop material, magnesium manganese ferrite ($Mg_{.645}Mn_{.534}Fe_{1.821}O_4$)

Starting materials: 316.24 milliliters $FeSO_4$ (21.92 milligrams iron per milliliter of solution); 21.13 milliliters $MgSO_4$ (50.60 milligrams magnesium per milliliter of solution); 17.37 milliliters $MnSO_4$ solution (115.13 milligrams manganese per milliliter of solution). The procedure of Example 2 was followed in the atomizing and drying of the resultant droplets. Substantially complete decomposition resulted after two hours of calcining at 800° C. Again, a ⅜ inch thick disc was pressed at 25,000 pounds per square inch. Firing was carried out in oxygen for a period of ten hours at 1250° C. and cooling was carried out in nitrogen. The loop properties of the resultant fired body were measured on a hysteresis loop tracer. Squareness in terms of remanent magnetization divided by saturation magnetization exceeded 95 percent. Coercivity was 0.59 oersted. By comparison, the same composition prepared by conventional ball milling for a period of sixteen hours, followed by the same firing conditions resulted in a material which, while evidencing the same squareness, had a coercivity of 1.95 oersteds. The decreased coercivity resulting from the freeze dry process indicates more complete reaction.

The invention has necessarily been described in terms of a limited number of embodiments. The small number of illustrative examples set forth indicates the benefits which generally accrue by use of the inventive processes. While these processes are extremely flexible, so that variations of the conditions noted may result in tailoring of the end product in any manner desired, the compositional and structional homogeneity which naturally follows from the rapid freezing of the molecular mixture results in more expedient processing and/or extremely homogeneous final compacted bodies have been briefly discussed. Other variations are apparent. It is intended that all such variations be encompassed within the appended claims.

What is claimed is:

1. Process for forming a compacted body of polycrystalline ceramic comprising pressing and firing a mass of particulate matter of the desired composition, characterized in that the said particulate matter is produced by a method comprising the steps of freezing freely suspended liquid droplets of a solution capable of yielding the said composition and removing solvent from such frozen droplets by sublimation.

2. Process of claim 1 in which the chemical nature of the particles is altered subsequent to removal of solvent by sublimation.

3. Process of claim 2 in which such alteration results from thermal decomposition.

4. Process of claim 3 in which the said thermal decomposition results in oxidic material.

5. Process of claim 1 in which the particles are admixed with a temporary binder prior to pressing, and in which the binder is substantially eliminated during firing.

6. Process of claim 1 in which the said composition contains at least two components.

7. Process of claim 6 in which the compacted body is a ferrite.

8. Process of claim 6 in which the compacted body is of the garnet structure.

9. Process of claim 1 in accordance with which droplet formation is in a cold fluid environment and in which freezing takes place within a maximum period of one second.

10. Process of claim 9 in which freezing takes place within a maximum period of about 0.05 second.

11. Process of claim 9 in which the said fluid is liquid.

12. Process of claim 11 in which the maximum droplet dimension is two millimeters.

13. Process of claim 1 in which the droplets are crushed prior to pressing.

References Cited

UNITED STATES PATENTS

| 3,189,550 | 6/1965 | Malinofsky | 252—62.56 |
| 3,218,726 | 11/1965 | Muir | 34—5 |
| 3,281,950 | 11/1966 | Kautz | 34—5 |
| 3,422,167 | 1/1969 | Bowman et al. | 34—5 |

FOREIGN PATENTS 644,639  10/1950  Great Britain.

TOBIAS E. LEVOW, Primary Examiner

R. D. EDMONDS, Assistant Examiner

U.S. Cl. X.R.

23—294, 51; 34—5; 106—39; 252—62.9, 62.57, 62.58, 62.62; 264—28